(12) United States Patent
Likar (10) Patent No.: US 10,205,724 B2
(45) Date of Patent: Feb. 12, 2019

(54) CLOUD-BASED ONBOARDING OF CLOUD-CONTROLLED WI-FI NETWORK DEVICES

(71) Applicant: CLOUDMONDO, INC., Santa Clara, CA (US)

(72) Inventor: Bojan Likar, Cupertino, CA (US)

(73) Assignee: Neutrino8, Inc., Santa Clara, CA (US)

( * ) Notice: Subject to any disclaimer, the term of this patent is extended or adjusted under 35 U.S.C. 154(b) by 0 days.

(21) Appl. No.: 15/476,851

(22) Filed: Mar. 31, 2017

(65) Prior Publication Data

US 2018/0183790 A1    Jun. 28, 2018

Related U.S. Application Data

(63) Continuation-in-part of application No. 15/391,790, filed on Dec. 27, 2016.

(51) Int. Cl.
| | |
|---|---|
| *H04L 29/06* | (2006.01) |
| *H04W 12/06* | (2009.01) |
| *H04L 12/24* | (2006.01) |
| *H04W 48/16* | (2009.01) |
| *H04W 8/00* | (2009.01) |
| *H04W 84/12* | (2009.01) |
| *H04L 29/08* | (2006.01) |

(52) U.S. Cl.
CPC .......... *H04L 63/0876* (2013.01); *H04L 41/08* (2013.01); *H04L 63/102* (2013.01); *H04W 12/06* (2013.01); *H04L 63/08* (2013.01); *H04L 67/306* (2013.01); *H04W 8/005* (2013.01); *H04W 48/16* (2013.01); *H04W 84/12* (2013.01)

(58) Field of Classification Search
CPC .......................... H04L 63/0878; H04L 63/102
See application file for complete search history.

(56) References Cited

U.S. PATENT DOCUMENTS

| | | | | |
|---|---|---|---|---|
| 9,143,400 | B1* | 9/2015 | Roskind | H04L 41/0896 |
| 9,609,519 | B2* | 3/2017 | Chen | H04W 16/06 |
| 2013/0304879 | A1* | 11/2013 | Schmidt | H04W 12/06 |
| | | | | 709/220 |
| 2015/0077231 | A1* | 3/2015 | Kang | G08C 17/02 |
| | | | | 340/12.54 |
| 2015/0081837 | A1* | 3/2015 | Bernier | H04W 8/24 |
| | | | | 709/217 |
| 2017/0078880 | A1* | 3/2017 | Likar | H04W 12/06 |
| 2017/0134940 | A1* | 5/2017 | Sharma | H04W 12/04 |
| 2017/0135085 | A1* | 5/2017 | Kaushik | H04W 72/046 |
| 2017/0289885 | A1* | 10/2017 | Kaushik | H04W 36/18 |
| 2017/0300732 | A1* | 10/2017 | Likar | G06K 7/1417 |

\* cited by examiner

*Primary Examiner* — Parth Patel
(74) *Attorney, Agent, or Firm* — Law Office of Dorian Cartwright; Dorian Cartwright (57) ABSTRACT

A cloud-based onboarding server receives first identification information associated with a network device, from a wireless station authenticated to the cloud-based Wi-Fi onboarding server, the identification information being sent on behalf of the network device. Additionally, second identification information associated with the network device is received from the network device. Responsive to the first identification information matching the second identification information, the network device is associated with a user account.

10 Claims, 8 Drawing Sheets

CLOUD-BASED ONBOARDING OF CLOUD-CONTROLLED WI-FI NETWORK DEVICES

CROSS-REFERENCE TO RELATED APPLICATIONS

This application claims the benefit of priority as a continuation-in part under 35 U.S.C. 120 to U.S. application Ser. No. 15/391,790, filed Dec. 27, 2016, entitled WIRELESS CONFIGURATION OF WIRELESS DISTRIBUTION SYSTEM (WDS) RANGE EXTENDERS USING NON-WI-FI WIRELESS COMMUNICATION CHANNELS, by Rajinder SINGH, which is commonly owned, the contents of which being hereby incorporated by reference in its entirety.

FIELD OF THE INVENTION

The invention relates generally to a computerized networking system, and more specifically, to secure plug-and-play configuration of network devices from the cloud.

BACKGROUND

Many home and businesses maintain a wireless data network for wireless devices. A range of wireless networking depends on the combined coverage of for network components (e.g., wireless routers, wireless switches, range extenders, etc.) At times, there is a need to extend or improve wireless service by adding or rearranging networking components to improve the combined coverage range. However, many home users are not familiar with the set-up information needed to add routers, switches or extenders. Furthermore, businesses incur expenses for network administrators for these even more complex networks. Plug-and-play Conventional techniques for configuration of network components are performed through a wired connection by a network administrator, over several steps. More specifically, preconfigured SSID (service set identifier) and paraphrase information has to be correctly entered for accessing a network component. Next, a network administrator or home network user uses a wire connection or special address to access configurations for manual entry. If the network components are moved to new locations to improve coverage, configuration may again be required.

What is needed is a robust technique for plug-and-play wireless configuration of network devices remotely from a cloud.

SUMMARY

The above-mentioned needs are met with methods, computer products, and devices for a computer-implemented method for secure plug-and-play configuration for extending a Wi-Fi networking range with wireless distribution bridges.

In one embodiment, a cloud-based onboarding server receives first identification information associated with a network device, from a wireless station authenticated to the cloud-based Wi-Fi onboarding server, the identification information being sent on behalf of the network device. Additionally, second identification information associated with the network device is received from the network device. Responsive to the first identification information matching the second identification information, the network device is associated with a user account.

In some embodiments, a role of the network device within the Wi-Fi network is identified and configuration the network device is configured accordingly, from the cloud. Further, WDS configuration data, an SSID, a passphrase, or the like can be configured on the network device from the cloud.

Advantageously, performance of network devices is improved. Out of the box automation simplifies the extension and rearrangement of Wi-Fi range.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for plug-and-play configuration for onboarding a network device to a Wi-Fi network for cloud-based configuration, as described herein. As used herein, onboarding refers to registering network devices for cloud configuration. One of ordinary skill in the art will recognize variations to the disclosed embodiments that are contemplated, although not explicitly described.

I. Systems for Wi-Fi Onboarding of Network Devices (FIGS. 1-5)

Figure 1:
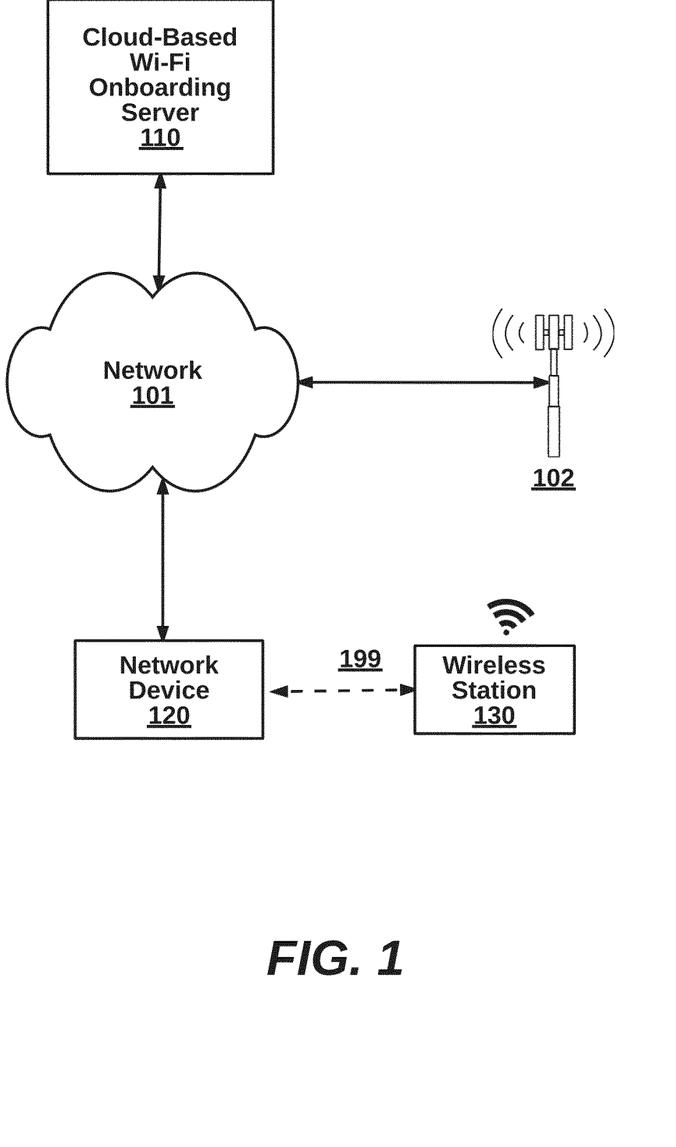
FIG. 1 is a high-level block diagram illustrating a system for plug-and-play configuration for onboarding a network device to a Wi-Fi network for cloud-based configuration, according to an embodiment.

FIG. 1 is a high-level block diagram illustrating a system 100 for plug-and-play configuration for onboarding a network device to a Wi-Fi network for cloud-based configuration, according to an embodiment.

The system 100 comprises a cloud-based Wi-Fi onboarding server 110, the network device 120 and wireless station 130. In other embodiments of the system 100, additional network components can also be part of the systems, such as firewalls, virus scanners, routers, switches, application servers, databases, as well as additional controllers, access points, access switches, stations, and the like. The network components as set forth throughout the different embodiments described herein can be implemented as hardware, software, or a combination of both. The system 100 can be implemented in home networking systems with easy consumer set-up. Also, system 100 can be implemented in enterprise networking systems for quick deployment without the need for a network administrator.

The components of the system 100 can communicate by transmitting data through a network 101. More specifically, the network 101 couples the cloud-based Wi-Fi onboarding server 110 to the network device 120, preferably over a wired connection. The network 101 can be the Internet, a wide area network, a local area network, an enterprise network, or the like. The network 101 can be a data network or a cellular network (e.g., 3G or 4G), or a combination of different types of networks. A cellular-to-data network unit 102 can couple the wireless station 130 to the cloud-based Wi-Fi onboarding server 110. Alternatively, the wireless channel 199 can couple the wireless station to the cloud-based Wi-Fi onboarding server 110, through the network device 120 or another network device.

The cloud-based Wi-Fi onboarding server 110 configures the network device 110 initially, and in some implementations, also subsequently updates network configurations. More specifically, the cloud-based Wi-Fi onboarding server 110 matches identification information received from the wireless station 130 over an authenticated communication channel to identification information received from the network device 120 over an unauthenticated communication channel, in order to authenticate the network device 120.

The automation provided by various services simplifies human interaction during configuration. A network device merely needs to be plugged in and powered up, and scanned from a trusted device (e.g., a digital camera integrated to the wireless station 130). From that point, an automated process eases complexity and human labor. Enterprise networks can be configured without the need for a network administrator.

The cloud-based Wi-Fi onboarding server 110 and other components of the system 100 can be any computerized device or processor driven device. Example embodiments include server blades, desktop computers, laptops, smart telephones, tablets, phablets and the like. In some cases, the cloud-based Wi-Fi onboarding server 110 is operated by a service provider that services various user accounts for different users. In other cases, the cloud-based Wi-Fi onboarding server 110 is owned by the same entity the owns associated access points. The cloud-based Wi-Fi onboarding server 110 can be the same entity that manufactures the new device 120, or not. In various implementations, a separate configuration server, or separate processes within a common server, handle other configurations processes after initial onboarding. More detailed embodiments of the cloud-based Wi-Fi onboarding server 110 are set forth below with respect to FIG. 2.

The network device 120 can be a Wi-Fi or hybrid access point, router, switch, or the like. In some cases, the network device 120 provides access to the network 101 for wireless stations (e.g., wireless station 130). In other cases, the network device 120 processes or observes network traffic without altering packet transmissions from source to destination. In one embodiment, the network device 120 is preconfigured with WDS configuration data, an SSID, or a passphrase that is updated at registration or later. More detailed embodiments of the master base station 130 are described in below with respect to FIG. 3.

WDS configuration data, in one embodiment, includes MAC addresses, BSSIDs, authentication credentials, wireless channels, encryption modes (e.g., certificates or shared secrets), and other information necessary for a Wi-Fi connections. There are other embodiments in which the WDS configuration data also includes authentication information or other security information.

The wireless station 130 provides a user interface (e.g., a web browser or mobile app) for a user that wants to onboard a new network device through the cloud-based onboarding server 110. For example, a dashboard for a user account can show configuration status and other topologies and configuration of the Wi-Fi network and other networks of the user. Furthermore, one embodiment of the wireless station 130 can scan the network device 120 for identification information which is then sent to the cloud-based Wi-Fi onboarding server 110 for matching.

Figure 8:
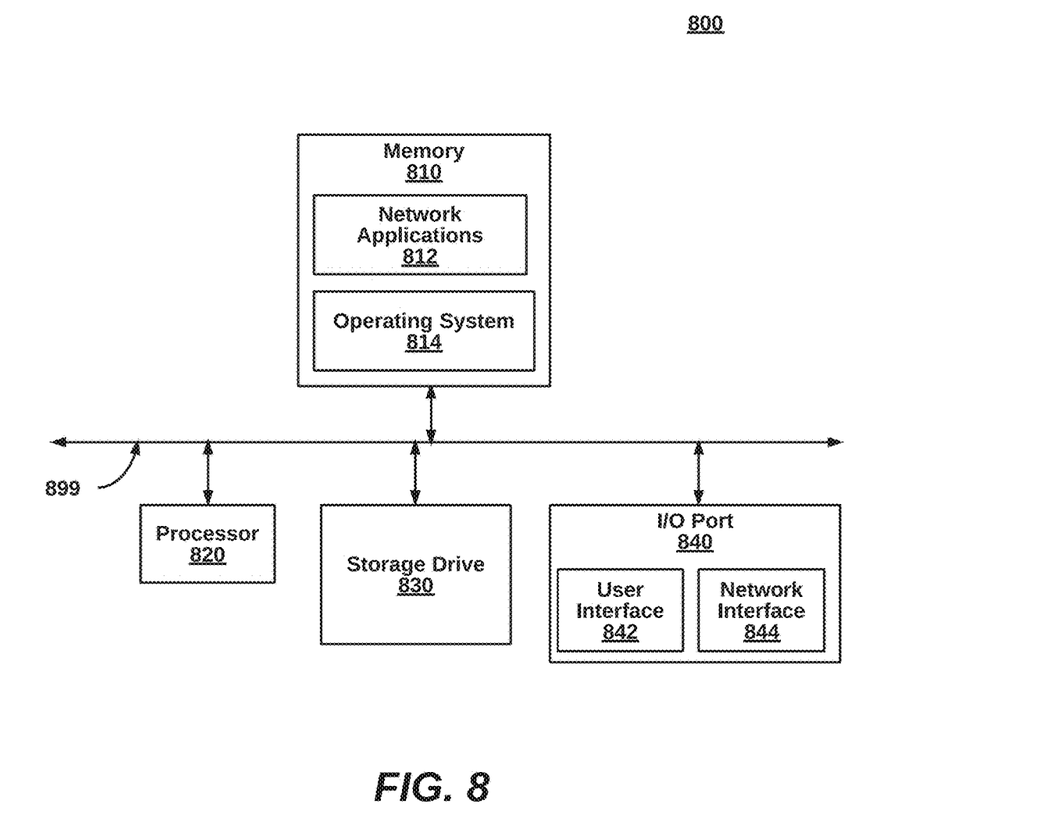
FIG. 8 is a block diagram illustrating an exemplary computing device for implementing the techniques described herein, according to one embodiment.

In some embodiments, the wireless station 130 can be a mobile telephone, a tablet, a phablet, a laptop, or be implemented by any of the computerized devices discussed herein, and generally in FIG. 8. For instance, a smart phone is typically equipped with Wi-Fi and cellular data network transceivers. A mobile app can be downloaded to coordinate between the heterogeneous communication channels and for communication with the cloud-based Wi-Fi onboarding server 110. Examples wireless station 130 is described in more detail below in association with FIG. 4.

Figure 2:
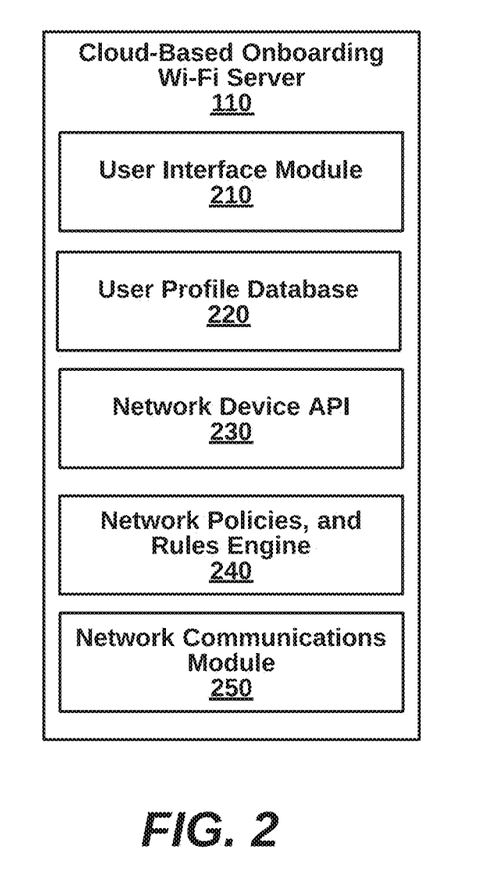
FIG. 2 is a more detailed block diagram illustrating a cloud-based Wi-Fi onboarding server of the system of FIG. 1, according to one embodiment.

FIG. 2 is a more detailed block diagram illustrating the cloud-based Wi-Fi onboarding server 110 of the system 100 of FIG. 1, according to one embodiment. The cloud-based Wi-Fi onboarding server 110 of this embodiment includes a user interface module 210, a user profile database 220, a network device API 230, a network policies and rules engine 240, and a network communication module 250.

The user interface module 210 provides access for users through a network browser or client-side mobile app, for example, to control a network. In one embodiment, high level settings are provided for average home users. In another embodiment, granular settings are provided for network administrators to set configurations. Settings can be saved as rules that are applied against data.

The user profile database 220 saves specific settings on a per-user, per-institution, per-entity basis, for instance. In one setting, a user can designate graphically from a mobile app which access point is designated as master and which as slaves. The information is stored and can be used when applying the rules of a user profile. Users can be, without limitation, network administrators, home owners, hot spot operator, smartphone users, employees on a PC, and the like.

The network device API 230 handles transactions and communications with network device being controlled by one or more customers. Configuration parameters, passphrases, authentication data, user information, device information, WDS info, and the like, can be sent from the network device API 230. Data is from access points is also received, including status, identification information for new access points, data about connected user stations, and more.

The network policies and rules engine 240 applies user settings to specific data. In one example, a rule for when authentication credentials of the network device should be updated from default, or out the box values, to preconfigured or newly designated values.

The networking communication module 250 can comprise networking interface components such as Wi-Fi radios, Wi-Fi antennae, transceivers, coders and decoders, digital signal processors, and other supporting lower level hardware and processes necessary for communication across channels. The networking hardware 250 can support different variations of IEEE 802.11, including multiple input/multiple output (MIMO) and other techniques. Returning to the task of sending generated parameters to slave base stations, data packets sent over the data network are received by an interface to a cellular data network (e.g., Verizon 4G cellular data network). A cellular data network including, for example, cell towers pass the data packets to wireless stations.

Figure 3:
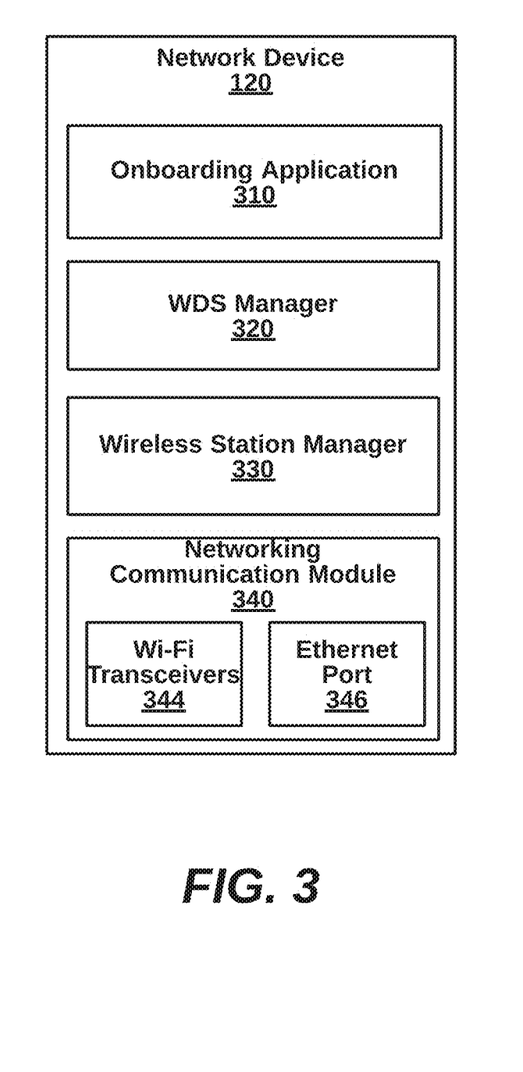
FIG. 3 is a more detailed block diagram illustrating the network device of the system in FIG. 1, according to one embodiment.

FIG. 3 is a more detailed block diagram illustrating a network device 120 of the system 100 of FIG. 1, according to one embodiment. The access point 120 includes an onboarding application 310, a WDS manager 320, a wireless station manager 330, and a networking communication module 340.

The onboarding application 310 can be executed as part of an operating system, or alternatively, as an application (e.g., downloaded application) interacting with an operating system. In an embodiment, the onboarding application 310 calls the cloud-based Wi-Fi onboarding sever 110 across the network 101 upon activation. The onboarding application 310 uses this unsecure channel to send identification information to be matched to the cloud-based Wi-Fi onboarding server 110. Once authenticated, the cloud-based Wi-Fi onboarding server 110 can send WDS configuration data, processed by the WDS manager 320, to automatically join the wireless channel.

The wireless station manager 330 registers wireless stations directly connecting without an intervening slave access point. In some cases, wireless stations can be handed off to other access points when moving from a radio range of one device to a radio range or another device.

The networking communication module 340 comprises a Wi-Fi transceiver 344 and an Ethernet port 346. In one instance, IEEE 802.11 network packets are received from wireless stations and are transformed to Ethernet packets forwarded to the destinations on the network 101. The reverse data path is also handled by the networking communication module 340. Other embodiments with different transceivers are possible.

Figure 4:
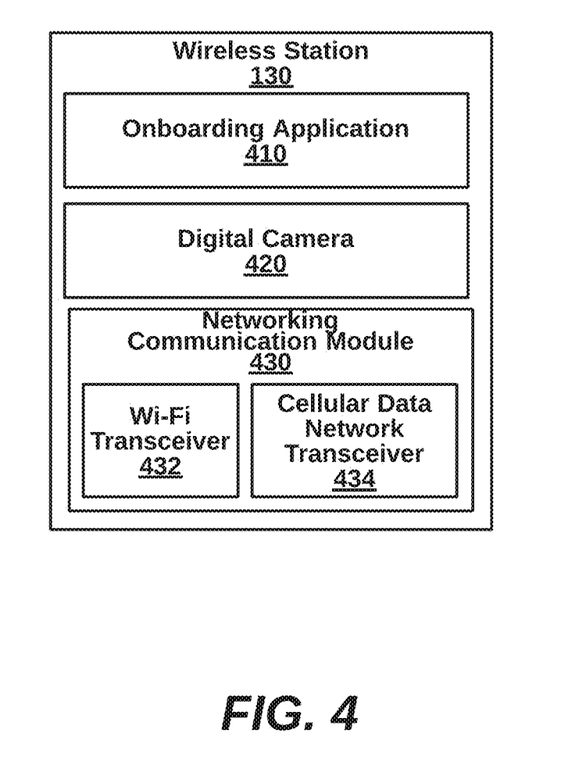
FIG. 4 is a more detailed block diagram illustrating a wireless station of the system of FIG. 1, according to an embodiment.

FIG. 4 is a more detailed block diagram illustrating the wireless station 130 of the system of FIG. 1, according to an embodiment. The wireless station 130 includes a onboarding application 410, a digital camera 420, and a networking communication module 430.

The onboarding application 410 can be executed as part of an operating system, or alternatively, as an application interacting with an operating system. A user interface component allows a user to log in to a server and make configuration changes. One embodiment notifies users in an animated manner of how to scan an onboarding access point. Another embodiment receives a scan from the digital camera 420 and sends the scan or extracted data including identification information upstream to the cloud-based Wi-Fi onboarding sever 110.

The networking communication module 430 includes hardware and software implementing lower level networking functionalities. In particular, a Wi-Fi transceiver 432 couples to a Wi-Fi device (e.g., network device 120) for data communications. Optionally, SMS provides data communications. A cellular data network transceiver 434 couples to a cell tower (e.g., the cellular-to-data network unit 102) for data communications. Optionally, SMS provides data communications.

Figure 5:
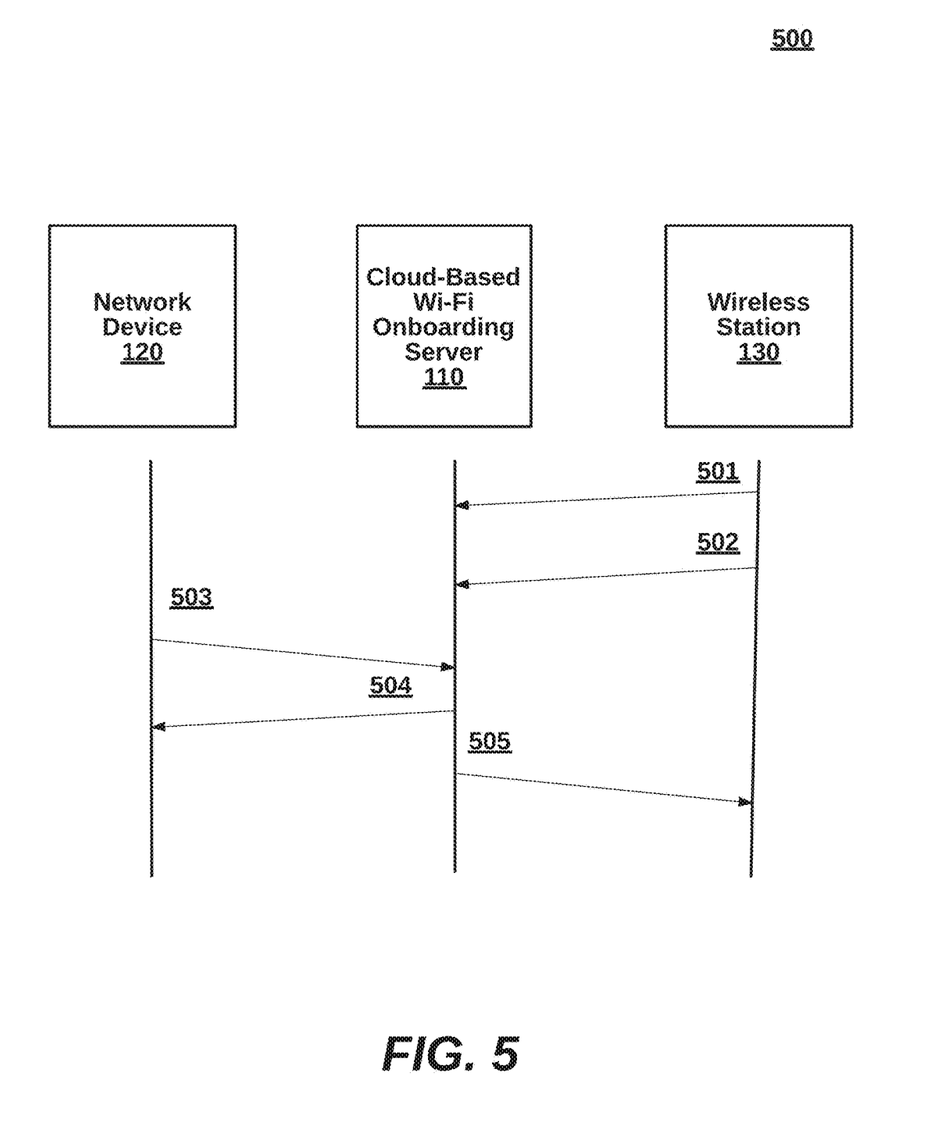
FIG. 5 is a sequence diagram illustrating interactions between components of the system in FIG. 1, according to one embodiment.

FIG. 5 is a sequence diagram illustrating interactions 500 between components of the system in FIG. 1, according to one embodiment. The specific interactions shown in FIG. 5 and described below can be performed in different orders, can include many sub-interactions, and still be contemplated by the present disclosure. Moreover, the method below of FIG. 6-7 describes processes that are internal to the components, as opposed to the external messages exchanged in FIG. 5.

Returning to FIG. 5, the network device 130 transmits authentication credentials to the cloud-based Wi-Fi onboarding server 110 (interaction 501) using an onboarding application through either Wi-Fi or cellular networks. Once a network device for onboarding has been scanned, identification information for the network device are transmitted (interaction 502) to the cloud-based Wi-Fi onboarding server 110. Separately, the network device 120, after being scanned by the wireless station 130, transmits its own identification information to the cloud-based Wi-Fi onboarding server 110 (interaction 503). Acknowledgments can be transmitted from the cloud-based Wi-Fi onboarding server 110 to the wireless station 130 (interactions 504, 505).

II. Methods for Wi-Fi Onboarding of Network Devices (FIGS. 6-7)

Figure 6:
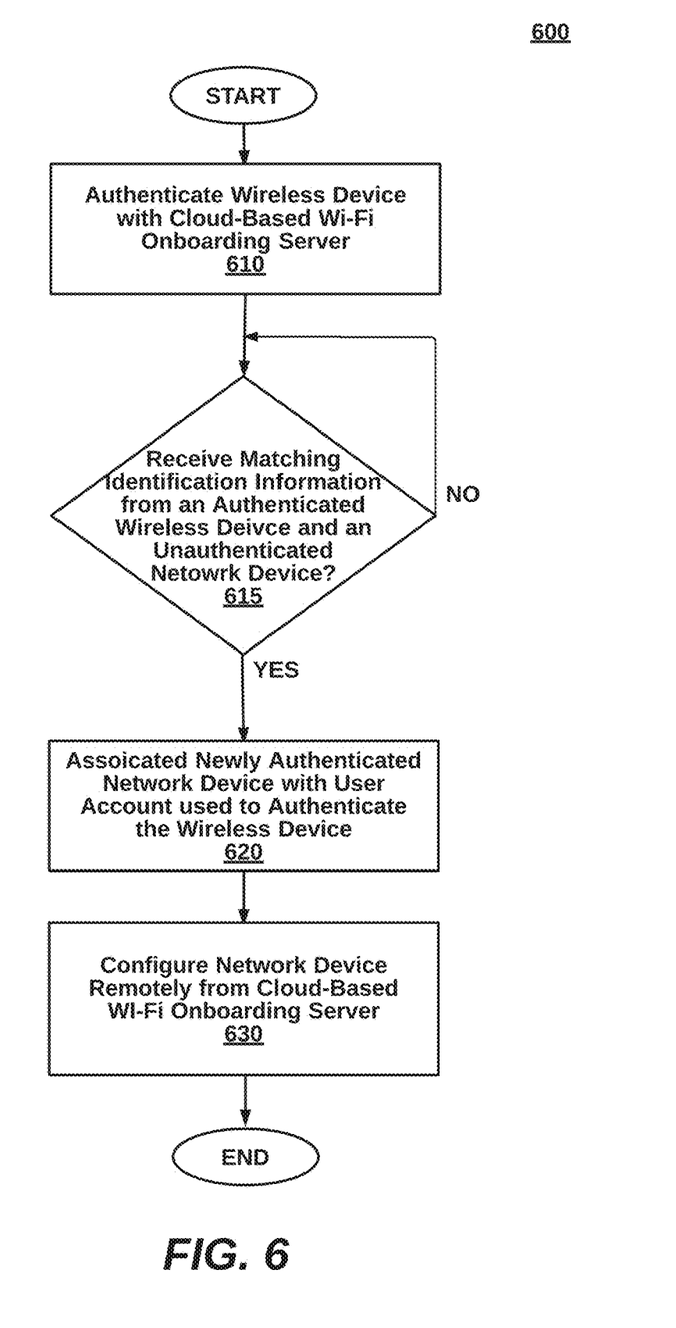
FIG. 6 is a high-level flow diagram illustrating a method for plug-and-play configuration for onboarding a network device to a Wi-Fi network for cloud-based configuration, according to one embodiment.
Figure 7A:
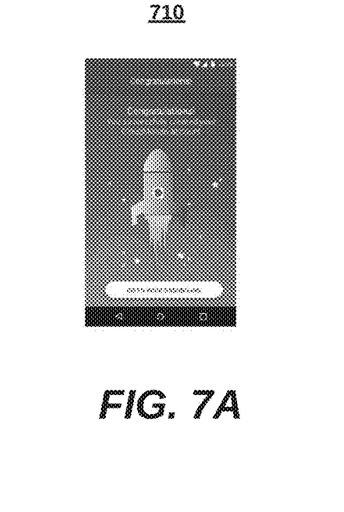
FIGS. 7A-7B are more detailed flow diagrams illustrating screen shots from the method of FIG. 6, according to an embodiment.
Figure 7B:
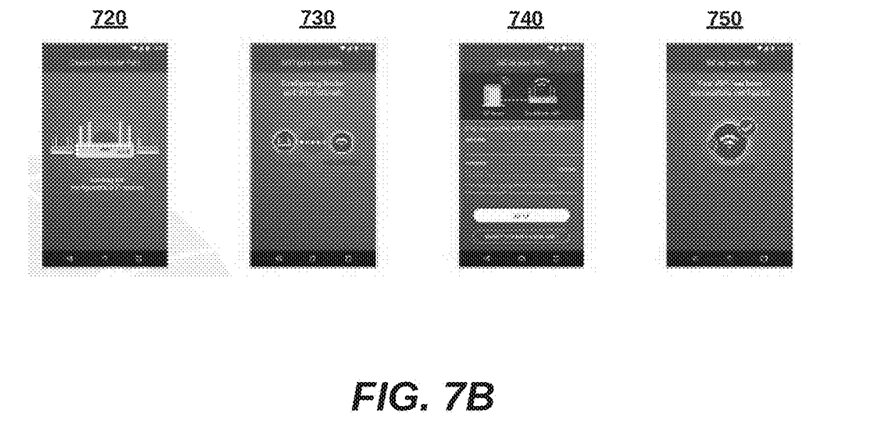

FIG. 6 is a high-level flow diagram illustrating a method 600 for plug-and-play configuration for onboarding a network device to a Wi-Fi network for cloud-based configuration, according to one embodiment. The method 600 is one example of the operation for the system 100.

At step 610, a wireless device authenticates with a cloud-based Wi-Fi onboarding server. In more detail, an onboarding app can display a user interface to a user for entering credentials such as a user name and a password, in one embodiment. Screenshot 710 shows an example display on the wireless device indicating successful authentication.

At step 615, matching identification information can be received from both the wireless device and a network device that is newly active (e.g., out of the box, power on, or reboot). The identification information can be a MAC, a serial number, an IP address, or the like. One implementation stores received identification information in a queue until a match is identified. Screenshots 720 and 730 show an example display on the wireless device indicating submission of identification information, and a successful match to the network device of the same.

In response to the match at step 615, at step 620, the newly authenticated network device is associated with a user account used to authenticate the wireless device.

At step 630, the network device is remotely configured from the cloud-based Wi-Fi onboarding server. Preconfigured network policies and rules can be stored in the user account and relevant configurations can be made to the network device, in one embodiment, and new settings are applied in another embodiment. Screenshots 730 and 740 show an example configuration of updating authentication credentials for stations and other network device authenticating to the network device.

III. Generic Computing Device (FIG. 8)

FIG. 8 is a block diagram illustrating an exemplary computing device 800 for use in the system 100 of FIG. 1, according to one embodiment. The computing device 800 is an exemplary device that is implementable for each of the components of the system 100, including the cloud based Wi-Fi Onboarding server 110, the network device 120, and the Wireless Station 130. The computing device 800 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 800, of the present embodiment, includes a memory 810, a processor 820, a storage drive 830, and an I/O port 840. Each of the components is coupled for electronic communication via a bus 899. Communication can be digital and/or analog, and use any suitable protocol.

The memory 810 further comprises network applications 812 and an operating system 814. The network applications 812 can include the modules of the components illustrated in FIGS. 1. Other network applications 812 can include a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 88 or the storage drive 830.

The storage drive 830 can be any non-volatile type of storage such as a magnetic disc, EEPROM, Flash, or the like. The storage drive 630 stores code and data for applications.

The I/O port 840 further comprises a user interface 842 and a network interface 844. The user interface 842 can output to a display device and receive input from, for example, a keyboard. The network interface 844 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method, in a cloud-based Wi-Fi onboarding server of a data communication system, implemented at least partially in hardware, for secure plug-and-play configuration of network devices to improve performance of remote Wi-Fi networks, the method comprising the steps of:

establishing a secure communication channel between the cloud-based Wi-Fi onboarding server and a wireless station located on a specific remote Wi-Fi network by authenticating to a specific user account on the cloud-based Wi-Fi onboarding server among a plurality of user accounts;

receiving, at a network interface of the cloud-based Wi-Fi onboarding server, first identification information scanned from a network device by the wireless station authenticated to the cloud-based Wi-Fi onboarding server under the specific user account, the first identification information being sent on behalf of the network device;

receiving, at the network interface, second identification information associated with the network device, from the network device responsive to an attempt by the network device to access the specific remote Wi-Fi network;

recognizing, by a processor of the cloud-based Wi-Fi onboarding server, the second identification information as matching the first identification information;

responsive to the first identification information matching the second identification information, associating the network device with the specific user account;

identifying a role of the network device within the Wi-Fi network from the specific user account;

successfully configuring the network device for authenticated communication on the specific remote Wi-Fi network based on the role; and sending, over the network interface, a confirmation of the successful configuration as an indication that the network device is available for network service.

2. The method of claim 1, wherein the step of receiving the first identification information comprises receiving first identification information from the wireless station over an alternative wireless communication channel that is distinct from wired communication channel used by the network device.

3. The method of claim 1, wherein the network device comprises at least one of: a Wi-Fi router, an access point, a switch, a bride device, and a network extender device.

4. The method of claim 1, further comprising:
receiving authentication information from the wireless station, the authentication information associated with a wireless station authenticating to the new device;
identifying alternative authentication information for the new device; and
updating the network device with the alternative authentication information.

5. The method of claim 4, wherein the alternative authentication information comprises SSID authentication credentials for the Wi-Fi network, wherein an SSID for the SSID authentication credentials was active in the Wi-Fi network prior to being joined by the network device.

6. The method of claim 1, wherein the temporary secure channel is accessed with a preconfigured SSID, known to the access point and the active access point, and the access point using the paraphrase to authenticate to the active access point, the paraphrase being based on the identification information in order to match passphrase generated by the cloud-based Wi-Fi onboarding server.

7. The method of claim 1, wherein the first identification is scanned by the wireless device from a label associated with the network device.

8. The method of claim 1, identifying a role of the network device within the Wi-Fi network further comprises retrieving to a network topology of existing device on the Wi-Fi network.

9. The method of claim 1, further comprising:
prior to the step of receiving the first identification information, receiving log-in credentials from the wireless station.

10. A non-transitory computer-readable media storing source code that, when executed, performs a computer-implemented method in a cloud-based Wi-Fi onboarding server of a data communication system, implemented at least partially in hardware, for secure plug-and-play configuration of network devices to improve performance of remote Wi-Fi networks, the method comprising the steps of:
establishing a secure communication channel between the cloud-based Wi-Fi onboarding server and a wireless station located on a specific remote Wi-Fi network by authenticating to a specific user account on the cloud-based Wi-Fi onboarding server among a plurality of user accounts;
receiving, at a network interface of the cloud-based Wi-Fi onboarding server, first identification information scanned from a network device by the wireless station authenticated to the cloud-based Wi-Fi onboarding server under the specific user account, the first identification information being sent on behalf of the network device;
receiving, at the network interface, second identification information associated with the network device, from the network device responsive to an attempt by the network device to access the specific remote Wi-Fi network;
recognizing, by a processor of the cloud-based Wi-Fi onboarding server, the second identification information as matching the first identification information;
responsive to the first identification information matching the second identification information, associating the network device with the specific user account;
identifying a role of the network device within the Wi-Fi network from the specific user account;
successfully configuring the network device for authenticated communication on the specific remote Wi-Fi network based on the role; and
sending, over the network interface, a confirmation of the successful configuration as an indication that the network device is available for network service.

* * * * *